US009669868B2

(12) United States Patent
Fukuoka et al.

(10) Patent No.: US 9,669,868 B2
(45) Date of Patent: Jun. 6, 2017

(54) ELECTRIC MOBILITY (71) Applicant: WHILL Inc., Kanagawa (JP)

(72) Inventors: Muneaki Fukuoka, Kanagawa (JP); Yoshihiro Hirata, Kanagawa (JP); Shuichi Tsutsumi, Tokyo (JP)

(73) Assignee: WHILL Inc., Kanagawa (JP)

( * ) Notice: Subject to any disclaimer, the term of this patent is extended or adjusted under 35 U.S.C. 154(b) by 0 days.

(21) Appl. No.: 14/941,970

(22) Filed: Nov. 16, 2015

(65) Prior Publication Data
US 2016/0137222 A1 May 19, 2016

(30) Foreign Application Priority Data

Nov. 17, 2014 (JP) ................................. 2014-232869

(51) Int. Cl.
| | |
|---|---|
| *B62D 6/00* | (2006.01) |
| *B60L 3/00* | (2006.01) |
| *A61G 5/04* | (2013.01) |
| *A61G 5/10* | (2006.01) |

(Continued)

(52) U.S. Cl.
CPC ................ *B62D 6/00* (2013.01); *A61G 5/04* (2013.01); *A61G 5/045* (2013.01); *A61G 5/10* (2013.01); *B60L 3/0015* (2013.01); *B62D 47/00* (2013.01); *G08C 17/02* (2013.01);
(Continued)

(58) Field of Classification Search
CPC .... B60L 3/00; A61G 5/04; A61G 5/10; A61G 5/00
See application file for complete search history.

(56) References Cited

U.S. PATENT DOCUMENTS

| | | | |
|---|---|---|---|
| 7,344,430 B2 * | 3/2008 | Hasty | A63H 17/395 180/167 |
| 8,280,561 B2 * | 10/2012 | Griggs | G05G 9/047 180/19.3 |
| 2003/0174085 A1 | 9/2003 | Gavish et al. | |

(Continued)

FOREIGN PATENT DOCUMENTS

| | | |
|---|---|---|
| JP | 2002-341939 | 11/2002 |
| JP | 2007-60982 A | 3/2007 |

(Continued)

OTHER PUBLICATIONS

Japanese Office Action/Decision to Grant from corresponding Japanese Application No. 2014-232869; dated Jun. 21, 2015; 3 pgs.

(Continued)

*Primary Examiner* — Brian Swenson
(74) *Attorney, Agent, or Firm* — Maier & Maier, PLLC (57) ABSTRACT

An operation unintended by a helper due to an incorrect operation or the like by an operator is prevented. An electric mobility includes a manual operation unit, a wireless operation unit, and a control unit that controls a driving wheel on the basis of either a first command signal output by the manual operation unit or a second command signal output by the wireless operation unit. The control unit sets a first control mode enabling an operation of the electric driving wheel by the manual operation unit and a second control mode disabling an operation of the electric driving wheel by the manual operation unit on the basis of a wireless signal transmitted from a wireless terminal.

12 Claims, 6 Drawing Sheets

(51) Int. Cl.
 B62D 47/00 (2006.01)
 G08C 17/02 (2006.01)
(52) U.S. Cl.
 CPC ...... *A61G 2203/12* (2013.01); *G08C 2201/93* (2013.01); *Y02T 90/16* (2013.01)

(56) References Cited

U.S. PATENT DOCUMENTS

| | | |
|---|---|---|
| 2005/0202752 A1 | 9/2005 | Bryner |
| 2007/0034433 A1 | 2/2007 | Gabriele |
| 2011/0012548 A1 | 1/2011 | Wilcox et al. |
| 2014/0052319 A1* | 2/2014 | Taylor .................. G07C 5/008 701/22 |
| 2014/0132082 A1* | 5/2014 | McGinn ............... G05D 1/0061 307/125 |
| 2016/0202680 A1* | 7/2016 | Chin .................... G05B 19/042 700/40 |

FOREIGN PATENT DOCUMENTS

| | | |
|---|---|---|
| JP | 2007-143886 A | 6/2007 |
| JP | 2010-284469 A | 12/2010 |

OTHER PUBLICATIONS

Extended European Search Report dated Mar. 23, 2016, including the European Search Report and the European Search Opinion, in connection with corresponding EP Application No. 15194731.4 (8 pgs).

* cited by examiner

ELECTRIC MOBILITY

CROSS-REFERENCE TO RELATED APPLICATIONS

This application is based on Japanese Patent Application No. 2014-232869, the contents of which are incorporated herein by reference in its entirety.

TECHNICAL FIELD

The present disclosure relates to an electric mobility.

BACKGROUND ART

Riding type tractors capable of switching between manual steering and automatic steering have been known (for example, see Japanese Unexamined Patent Application, Publication No. 2007-60982).

In a riding type tractor disclosed in Japanese Unexamined Patent Application, Publication No. 2007-60982, when a manual operation by a steering handle is continued for a predetermined time in automatic steering based on a course detection result by an image recognition device, the automatic steering is switched to manual steering.

It is assumed that a vehicle for performing special work such as the riding type tractor in Japanese Unexamined Patent Application, Publication No. 2007-60982 is manually operated by a skilled operator. Accordingly, even when automatic steering is automatically switched to manual steering, an unintended operation of the vehicle caused by an incorrect operation by the operator cannot happen.

However, when an operator who is not skilled in manual steering (for example, an operator who needs to be helped by a helper) occupies a vehicle, it is not necessarily desirable to automatically switch automatic steering to manual steering as in Japanese Unexamined Patent Application, Publication No. 2007-60982. For example, when an operator who needs to be helped by a helper performs manual steering by an incorrect operation, the vehicle may perform an operation unintended by the helper.

SUMMARY

The present disclosure has been achieved in view of the above situations, and an object of the present disclosure is to provide an electric mobility capable of preventing an incorrect operation by an operator or the like from causing a movement unintended by a helper in a case where the operator who needs to be helped by the helper occupies the electric mobility.

To achieve the above object, the present disclosure provides the following solutions.

An electric mobility according to an aspect of the present disclosure includes an electric driving wheel, a body that supports the electric driving wheel in a rotatable way around an axle, a manual operation unit that accepts a manual operation by an operator and outputs a first command signal to drive the electric driving wheel, a wireless operation unit that accepts a wireless operation transmitted from a wireless terminal and outputs a second command signal to drive the electric driving wheel, and a control unit that controls the electric driving wheel on the basis of either the first command signal output by the manual operation unit or the second command signal output by the wireless operation unit. The control unit sets a first control mode in which a manual operation of the electric driving wheel by the manual operation unit is enabled and a second control mode in which a manual operation of the electric driving wheel by the manual operation unit is disabled on the basis of a wireless signal transmitted from the wireless terminal.

In the electric mobility according to the aspect of the present disclosure, the electric driving wheel is controlled by the control unit on the basis of either the first command signal output by the manual operation unit or the second command signal output by the wireless operation unit. In this case, when an operator who needs help occupies the electric mobility, a helper may transmit a wireless signal for setting the second control mode through the wireless terminal to disable operations of the electric driving wheel by the manual operation unit. Accordingly, even when the manual operation unit accepts a manual operation caused by an incorrect operation or the like by the operator who needs help, control of the electric driving wheel caused by the manual operation can be prevented. On the other hand, when an operator who can steer the electric mobility by himself/herself occupies the electric mobility, a wireless signal for setting the first control mode may be transmitted from the wireless terminal to allow the operator to operate the electric driving wheel with the manual operation unit.

In the electric mobility according to the aspect of the present disclosure, when the electric mobility are operated in the first control mode, the control unit may disable control of the electric driving wheel based on the second command signal.

Accordingly, when the first control mode is set and the operator operates the electric driving wheel with the manual operation unit, a helper may input a wireless operation through the wireless terminal, but the second command signal generated by the wireless operation cannot operate the electric driving wheel. Therefore, when the electric mobility having the above configuration are operated in the first control mode, control of the electric driving wheels that is unintended by the operator can be prevented.

In the electric mobility according to the aspect of the present disclosure, when the electric mobility are operated in the first control mode and both the first command signal and the second command signal are output, the control unit may control the electric driving wheel on the basis of the second command signal output by the wireless operation unit.

According to this configuration, when the first control mode is set and the operator operates the electric driving wheel with the manual operation unit, both the manual operation unit and the wireless operation unit may output respective command signals. At that time, the electric driving wheel is controlled on the basis of the second command signal output by the wireless operation unit preferentially over the first command signal output by the manual operation unit. Therefore, even when an incorrect operation or the like by the operator is input, the helper can operate the electric mobility in a way intended by the helper.

In the electric mobility according to the aspect of the present disclosure, when the electric mobility are operated in the first control mode and both the first command signal and the second command signal are output, the control unit may control the electric driving wheel on the basis of the first command signal output by the manual operation unit.

According to this configuration, when the first control mode is set and the operator operates the electric driving wheel with the manual operation unit, both the manual operation unit and the wireless operation unit may output respective command signals. At that time, the electric driving wheel is controlled on the basis of the first command signal output by the manual operation unit preferentially over the second command signal output by the wireless operation unit. Therefore, when the first control mode is set, the operator can operate the electric mobility in a way intended by the operator.

In the electric mobility according to the aspect of the present disclosure, when a communication state with the wireless terminal is not established, the control unit may set the second control mode.

Accordingly, when the helper cannot operate the electric mobility through a wireless operation from the wireless terminal, the operator may perform a manual operation but the electric mobility can be set in the second control mode to disable the manual operation. Therefore, when the operator cannot be helped by the helper, the operator can be prevented from operating the electric driving wheel.

In the electric mobility according to the aspect of the present disclosure, when a communication state with the wireless terminal is established and then interrupted, the control unit may set the first control mode.

Accordingly, even when the established communication state between the electric mobility and the wireless terminal is interrupted due to a used state of the wireless terminal or the like (for example, an incoming call at the wireless terminal having a phone call function), the electric mobility can be set in the second control mode to enable manual operations. Thus, even when wireless operations by the wireless terminal are temporarily disabled due to a used state of the wireless terminal or the like, the electric mobility can be operated through manual operations. Therefore, even when wireless operations are temporarily disabled at a dangerous place (a pedestrian crossing, a railroad crossing, or the like), the electric mobility can be moved through manual operations.

In the electric mobility having the above configuration, when the second control mode is set on the basis of a wireless signal transmitted from the wireless terminal and a predetermined time has elapsed since interruption of the communication state, the control unit may switch the first control mode to the second control mode.

Accordingly, until the predetermined time has elapsed since interruption of the communication state, manual operations by the operator can be temporarily enabled and the control mode can be switched to the control mode for disabling manual operations again.

Consequently, the present disclosure can provide an electric mobility capable of preventing an incorrect operation by an operator or the like from causing a movement unintended by a helper in a case where the operator who needs to be helped by the helper occupies the electric mobility.

DESCRIPTION OF EMBODIMENTS

An electric mobility 100 of an embodiment of the present disclosure will be described below with reference to the drawings.

Figure 1:
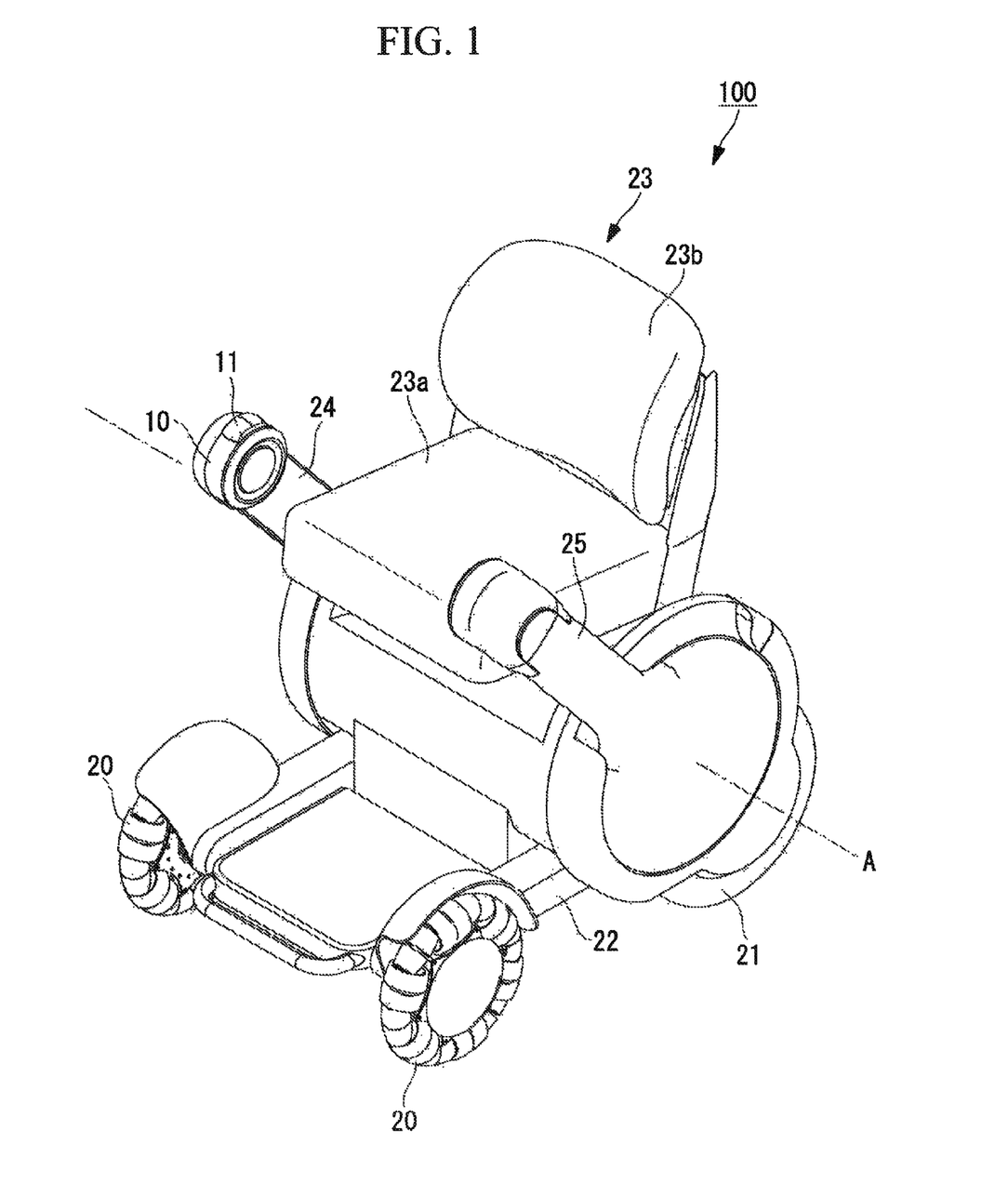
FIG. 1 is a perspective view of an electric mobility of an embodiment.
Figure 2:
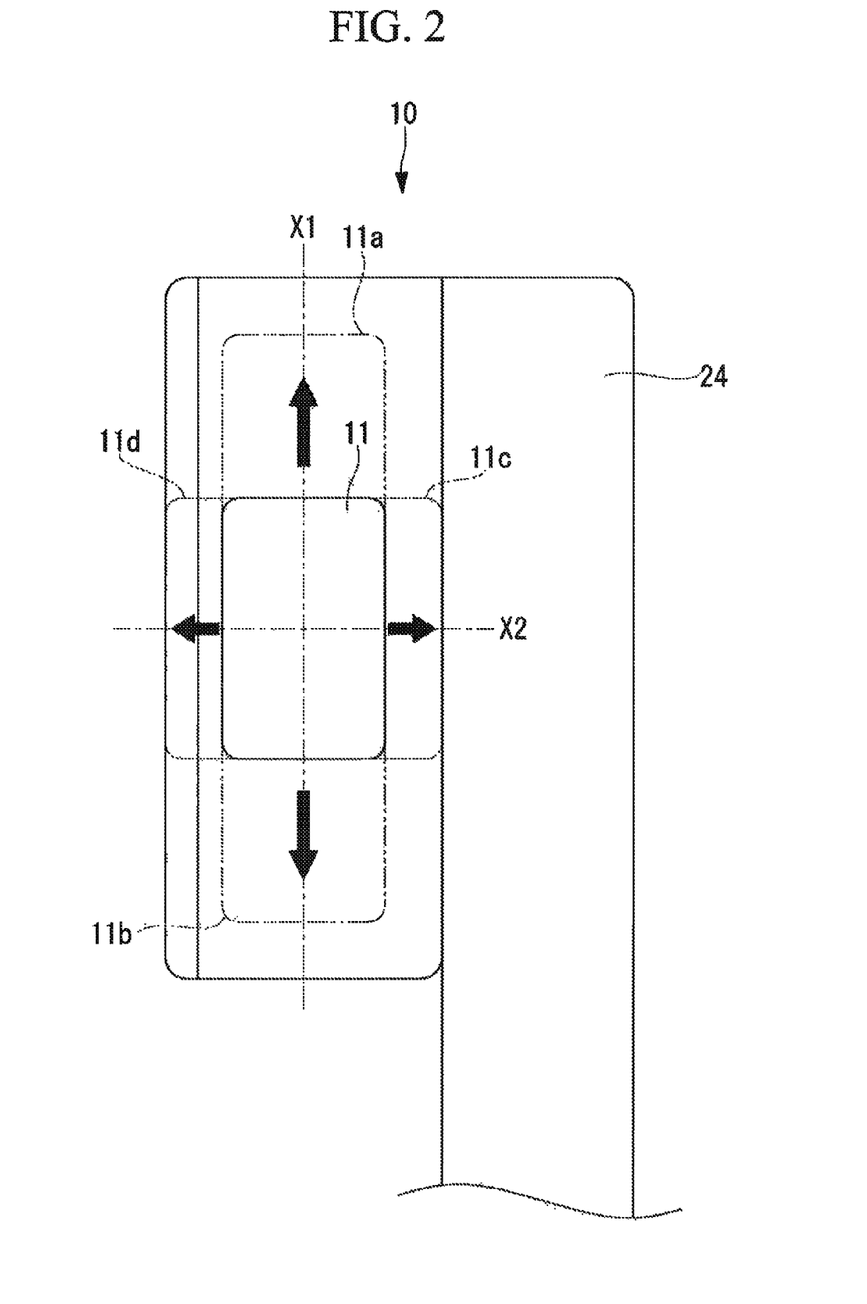
FIG. 2 is a plan view of an operation unit illustrated in FIG. 1.
Figure 3:
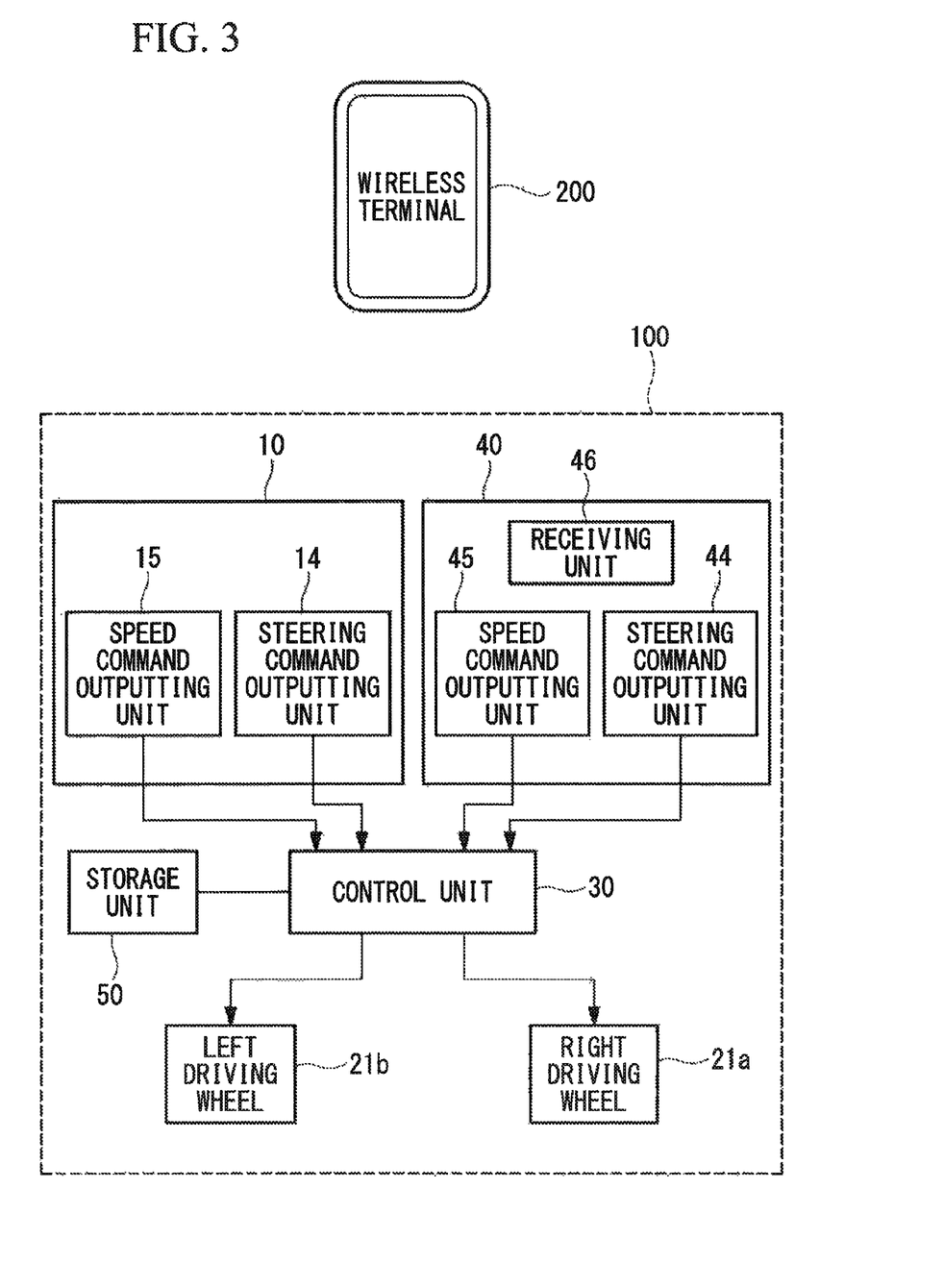
FIG. 3 is a block diagram illustrating a control configuration of the electric mobility illustrated in FIG. 1 and a wireless terminal.

As illustrated in FIG. 1 and FIG. 2, the electric mobility 100 of the present embodiment includes a manual operation unit 10, front wheels 20, rear wheels 21, a body frame 22, a seat 23, and a pair of handles 24 and 25. As illustrated in FIG. 3, the electric mobility 100 of the present embodiment further includes a control unit 30, a wireless operation unit 40, and a storage unit 50.

As illustrated in FIG. 1, the front wheels 20 and the rear wheels 21 are placed with respective spaces therebetween in a traveling direction.

As illustrated in FIG. 3, a right driving wheel 21a and a left driving wheel 21b constitute the rear wheels 21. The right driving wheel 21a and the left driving wheel 21b are driving wheels respectively driven by a pair of electric motors (not illustrated) that are independent of each other. Power from the pair of electric motors is transmitted to a pair of the front wheels 20 through a driving belt (not illustrated).

Here, both the front wheels 20 and the rear wheels 21 are driving wheels. However, one of the front wheels 20 and the rear wheels 21 may be driving wheels and the other may be driven wheels.

The front wheel 20 is an omnidirectionally moving wheel that includes a plurality of rollers each having an axis line perpendicular to the radial direction of the wheel. When the front wheel 20 receives a force in a vehicle width direction, the plurality of rollers rotate around the respective axis lines. Accordingly, the front wheel 20 can move in the vehicle width direction. Combination of vehicle-width-direction movement and travelling-direction movement allows the vehicle (an omnidirectionally moving vehicle) with the front wheels 20 that are omnidirectionally moving wheels to move in all directions with respect to the ground contact surface of the vehicle.

As described above, the front wheel 20 and the rear wheel 21 that are placed at the right side in the vehicle width direction and the front wheel 20 and the rear wheel 21 that are placed at the left side in the vehicle width direction are driven by the respective electric motors that are independent of each other. Accordingly, the forward speed, the backward speed, and the travelling direction of the electric mobility 100 can be controlled by controlling the pair of electric motors separately.

The body frame 22 supports the front wheels 20 and the rear wheels 21 in such a way that the front wheels 20 and the rear wheels 21 are rotatable around the respective axles. In addition to the front wheels 20 and the rear wheels 21, the electric motors (not illustrated) serving as power sources for the driving wheels, the seat 23, the pair of handles 24 and 25, the control unit 30, and the wireless operation unit 40 are attached to the body frame 22.

The seat 23, on which an operator of the electric mobility 100 sits, includes a seat surface 23a and a backrest 23b. The seat 23 is placed above a position between the front wheels 20 and the rear wheels 21 and closer to the rear wheels 21. Under the seat surface 23a, a sliding member (not illustrated) movably attached to a rail member (not illustrated) that is attached to the upper part of the body frame 22 and extends in the traveling direction is attached. The position of the seat surface 23a to the body frame 22 can be fixed at an arbitrary position by moving the sliding member with respective to the rail member to be fixed by a rocking mechanism (not illustrated).

The pair of handles 24 and 25 are the handle 24 that is placed at the right side in the traveling direction of the electric mobility 100 and the handle 25 that is placed at the left side. The pair of handles 24 and 25 are placed at both sides of the operator who sits on the seat 23. The pair of handles 24 and 25 oscillate around an oscillation axis A that is parallel to the axles of the front wheels 20 and the rear wheels 21.

Of the pair of the handles 24 and 25, the handle 24 (a right handle) has an end part provided with the manual operation unit 10. The manual operation unit 10 is a device for operating the travelling speed and the steering direction of the electric mobility 100. As illustrated in FIG. 2, the manual operation unit 10 includes an operation member 11 that is displaced by a hand or the like of the operator of the electric mobility 100. The operator of the electric mobility 100 displaces the operation member 11 along the traveling direction and the vehicle width direction to input a manual operation for indicating the traveling direction and the steering direction of the electric mobility 100.

As illustrated in FIG. 2, an energizing mechanism (not illustrated) holds the operation member 11 at a neutral position shown by a solid line in FIG. 2. The operator can displace the operation member 11 to any position between a position 11*a* and a position 11*b* in a direction of an axis line X1, which matches the traveling direction. The operator can displace the operation member 11 to any position between a position 11*c* and a position 11*d* in a direction of an axis line X2, which matches the vehicle width direction. The operator can displace the operation member 11 to an arbitrary position from the neutral position as a center by combining the displacement along the axis line X1 and the displacement along the axis line X2.

When the operation member 11 is displaced to the position 11*a* in FIG. 2, the manual operation unit 10 outputs a speed command signal for making the electric mobility 100 move forward at a predetermined maximum speed. When the operation member 11 is displaced to the position 11*b* in FIG. 2, the manual operation unit 10 outputs a speed command signal for making the electric mobility 100 move backward at a predetermined maximum speed.

When the operation member 11 is displaced to the position 11*c* in FIG. 2, the manual operation unit 10 outputs a steering command signal for making the electric mobility 100 turn right at a predetermined maximum steering angle. When the operation member 11 is displaced to the position 11*d* in FIG. 2, the manual operation unit 10 outputs a steering command signal for making the electric mobility 100 turn left at a predetermined maximum steering angle.

In this way, the manual operation unit 10 accepts a manual operation of the operation member 11 by the operator and outputs a command signal (a first command signal) for driving the front wheels 20 and the rear wheels 21 (driving wheels).

Next, a control configuration of the electric mobility 100 of the present embodiment will be described with reference to FIG. 3.

As illustrated in FIG. 3, the electric mobility 100 of the present embodiment includes the manual operation unit 10, the wireless operation unit 40, and the control unit 30.

The manual operation unit 10 accepts a manual operation input by the operator, outputs a steering command signal from a steering command outputting unit 14 and outputs a speed command signal from a speed command outputting unit 15.

The wireless operation unit 40 accepts a wireless operation transmitted from a wireless terminal 200 and outputs a command signal (a second command signal) for driving the front wheels 20 and the rear wheels 21 (driving wheels). In the wireless operation unit 40, a receiving unit 46 receives a signal indicating a wireless operation transmitted from the wireless terminal 200. A steering command outputting unit 44 outputs a steering command signal on the basis of the wireless operation received by the receiving unit 46. A speed command outputting unit 45 outputs a speed command signal on the basis of the wireless operation received by the receiving unit 46.

When a manual operation is performed, the control unit 30 controls the electric motor (not illustrated) driving the right driving wheel 21*a* of the rear wheels 21 and the electric motor (not illustrated) driving the left driving wheel 21*b* on the basis of a steering command signal output from the steering command outputting unit 14 and a speed command signal output from the speed command outputting unit 15. When a wireless operation is performed, the control unit 30 controls the electric motor (not illustrated) driving the right driving wheel 21*a* of the rear wheels 21 and the electric motor (not illustrated) driving the left driving wheel 21*b* on the basis of a steering command signal output from the steering command outputting unit 44 and a speed command signal output from the speed command outputting unit 45.

The control unit 30 performs either a manual operation or a wireless operation selectively on the basis of processing shown in the flowchart in FIG. 6, which will be described later.

When a steering command signal is transmitted, the control unit 30 generates a steering control signal to make the right driving wheel 21*a* and the left driving wheel 21*b* turn to different directions at a same speed on the basis of the steering command signal. The steering control signal is a signal for controlling the steering direction and is a control signal for turning the driving wheels to different directions at a same speed. For example, when a steering command signal for right turning is output from the manual operation unit 10, the left driving wheel 21*b* and the right driving wheel 21*a* are turned to a forward direction and a backward direction, respectively.

When a speed command signal is transmitted, the control unit 30 generates a speed control signal to make the right driving wheel 21*a* and the left driving wheel 21*b* turn to a same direction at a same speed on the basis of the speed command signal. The speed control signal is a signal for controlling the traveling speed and is a control signal for turning the driving wheels to a same direction at a same speed.

The control unit 30 having generated a speed control signal and a steering control signal in the aforementioned manner superposes the speed control signal and the steering control signal, and transmits the control signals to the driving wheels.

When command signals output from the manual operation unit 10 to the control unit 30 include only speed command signals, the control unit 30 controls the driving wheels to move the electric mobility 100 forward or backward straight without turning the electric mobility 100 to the right or left.

When command signals output from the manual operation unit 10 to the control unit 30 include only steering command signals, the control unit 30 controls the driving wheels to turn the electric mobility 100 to the right or left in place to switch the steering direction without moving the electric mobility 100 forward or backward.

Next, a wireless operation through the wireless terminal 200 will be described with reference to FIG. 4.

For example, when an operator who needs to be helped by a helper occupies the electric mobility 100, the wireless terminal 200 receives a wireless operation by the helper. The wireless terminal 200 transmits a signal indicating the wireless operation accepted from the helper as a wireless signal using a wireless transmitting module (not illustrated). The wireless signal is a signal that can be received by the receiving unit 46 of the electric mobility 100.

As a wireless communication system used by the wireless terminal 200 and the receiving unit 46 of the electric mobility 100, various wireless communication systems including Bluetooth® and a wireless LAN conforming to IEEE 802.11 can be used.

Figure 4:
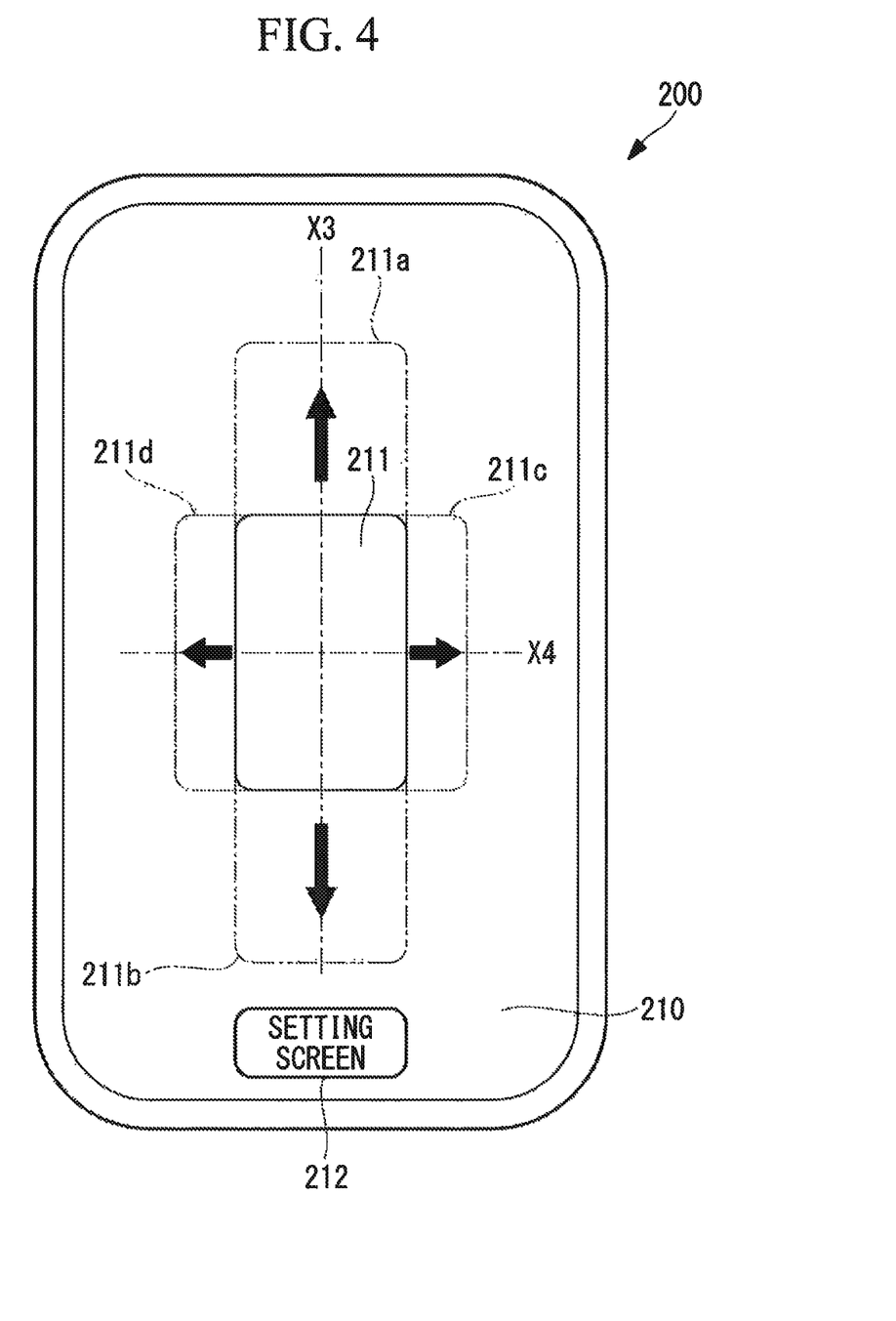
FIG. 4 is a diagram illustrating an operation screen of the wireless terminal illustrated in FIG. 3 for inputting a wireless operation.

As illustrated in FIG. 4, the wireless terminal 200 has an operation screen 210 that displays various types of image information and accepts an operation by an operator of the terminal. The operation screen 210 is a touch panel screen that can recognize a position touched by a finger or the like of the operator. The operator of the wireless terminal 200 touches the operation screen 210 with the finger or the like while visually recognizing image information displayed on the operation screen 210. Accordingly, the operator can input various operations to the wireless terminal 200.

The operator of the wireless terminal 200 in the present embodiment is a helper who helps the operator of the electric mobility 100. The helper inputs a wireless operation for operating the electric mobility 100 through the wireless terminal 200. The electric mobility 100 operates on the basis of a wireless operation accepted by the wireless terminal 200. Accordingly, the electric mobility 100 operates in a way intended by the helper.

As illustrated in FIG. 4, the operation screen 210 displays an operation piece 211 to be displaced by a hand or the like of the helper. The helper displaces the operation piece 211 along the traveling direction and the vehicle width direction on the operation screen 210. Accordingly, a wireless operation for indicating a travelling speed and a steering direction to the electric mobility 100 is input.

Arrows illustrated in FIG. 4 do not indicate an image to be displayed on the operation screen 210 but indicate examples of directions in which the operation piece 211 may be displaced.

As illustrated in FIG. 4, when the operation screen 210 is left untouched by the helper, the operation piece 211 is displayed at a neutral position shown by a solid line in FIG. 4. When the helper moves a finger along an axis line X3, which matches the traveling direction, while touching the operation piece 211 displayed on the operation screen 210 with the finger, the operation piece 211 can be displaced to any position between a position 211a and a position 211b.

When the helper moves a finger along an axis line X4, which matches the vehicle width direction, while touching the operation piece 211 displayed on the operation screen 210 with the finger, the operation piece 211 can be displaced to any position between a position 211c and a position 211d. The helper can displace the operation piece 211 to an arbitrary position by combining the displacement along the axis line X3 and the displacement along the axis line X4.

The wireless terminal 200 transmits a signal (a signal indicating a wireless operation) according to a position to which the operation piece 211 is displaced as a wireless signal using the wireless transmitting module (not illustrated). The wireless signal is received by the receiving unit 46 of the electric mobility 100.

When the operation piece 211 is displaced to the position 211a in FIG. 4, the speed command outputting unit 45 of the wireless operation unit 40 outputs a speed command signal for making the electric mobility 100 move forward at a predetermined maximum speed. When the operation piece 211 is displaced to the position 211b in FIG. 4, the speed command outputting unit 45 of the wireless operation unit 40 outputs a speed command signal for making the electric mobility 100 move backward at a predetermined maximum speed.

When the operation piece 211 is displaced to the position 211c in FIG. 4, the steering command outputting unit 44 of the wireless operation unit 40 outputs a steering command signal for making the electric mobility 100 turn right at a predetermined maximum steering angle. When the operation piece 211 is displaced to the position 211d in FIG. 4, the wireless operation unit 40 outputs a steering command signal for making the electric mobility 100 turn left at a predetermined maximum steering angle.

In this way, the wireless operation unit 40 accepts a wireless operation of the helper displacing the operation piece 211 displayed on the operation screen 210 of the wireless terminal 200 and outputs a command signal (the second command signal) for driving the front wheels 20 and the rear wheels 21 (driving wheels).

Next, setting of a manual operation and a wireless operation by the wireless terminal 200 will be described with reference to FIG. 5.

As described above, the electric mobility 100 is controlled on the basis of either a command signal (the first command signal) output by the manual operation unit 10 or a command signal (the second command signal) output by the wireless operation unit 40.

Figure 5:
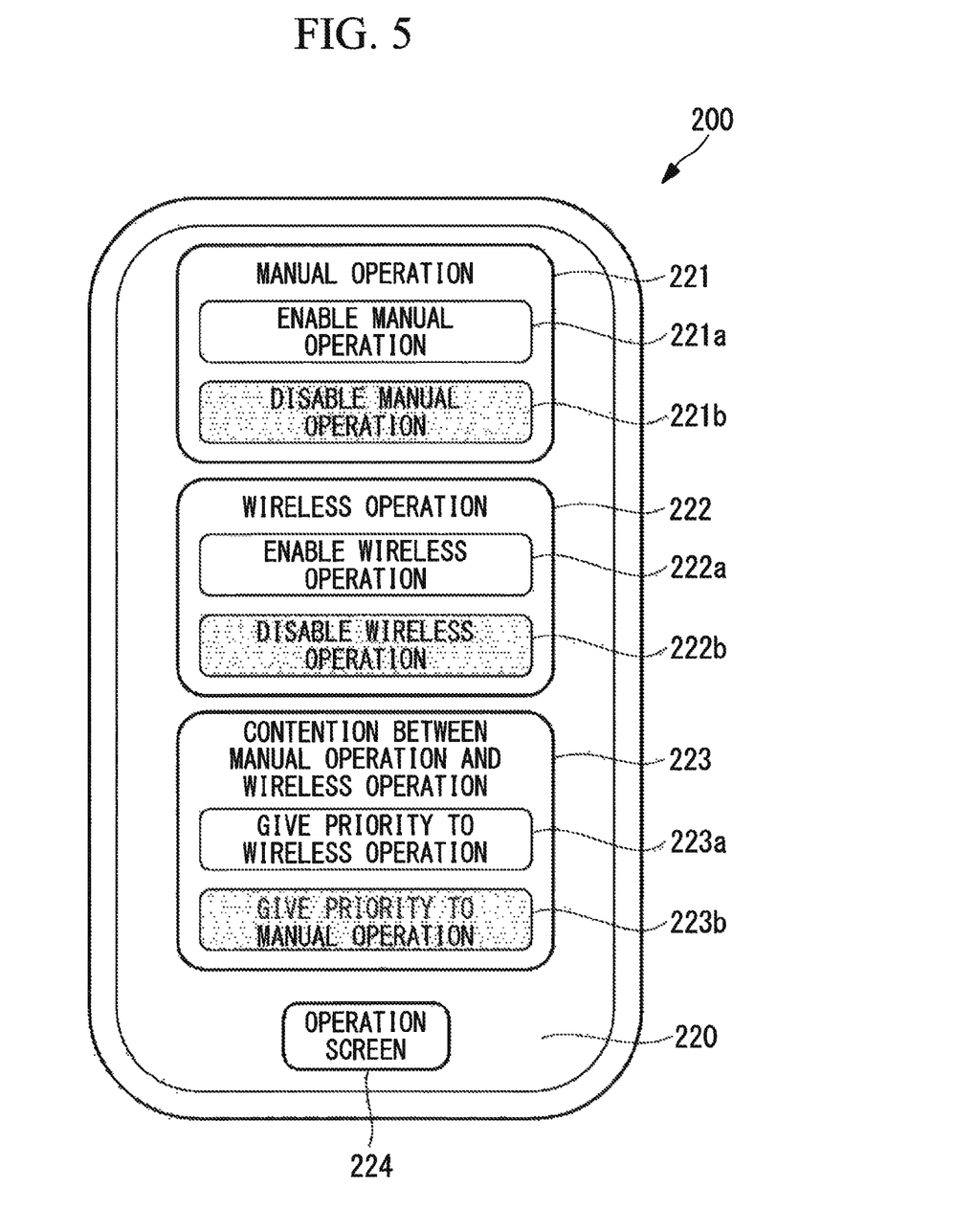
FIG. 5 is a diagram illustrating an operation screen of the wireless terminal illustrated in FIG. 3 for inputting operation setting.

The helper can set which of a manual operation by the manual operation unit 10 or a wireless operation by the wireless operation unit 40 should be performed by the electric mobility 100 through an operation screen illustrated in FIG. 5. For example, the helper can set disablement of manual operations by the manual operation unit 10 through the operation screen illustrated in FIG. 5.

When a setting-screen button 212 on the operation screen 210 illustrated in FIG. 4 is pressed, an operation screen 220 illustrated in FIG. 5 is displayed. When an operation-screen button 224 on the operation screen 220 illustrated in FIG. 5 is pressed, the operation screen 210 illustrated in FIG. 4 is displayed.

A region 221 in the operation screen 220 illustrated in FIG. 5 is a region for setting enablement or disablement of manual operations by the manual operation unit 10. When the helper touches a region 221a of the region 221, the wireless terminal 200 transmits a wireless signal indicating enablement of manual operations by the manual operation unit 10. When the helper touches a region 221b of the region 221, the wireless terminal 200 transmits a wireless signal indicating disablement of manual operations by the manual operation unit 10. FIG. 5 illustrates a state where the helper touches the region 221a and a wireless signal indicating enablement of manual operations is transmitted.

A region 222 in the operation screen 220 illustrated in FIG. 5 is a region for setting enablement or disablement of wireless operations by the wireless operation unit 40. When the helper touches a region 222a of the region 222, the wireless terminal 200 transmits a wireless signal indicating enablement of wireless operations by the wireless operation unit 40. When the helper touches a region 222b of the region 222, the wireless terminal 200 transmits a wireless signal indicating disablement of wireless operations by the wireless operation unit 40. FIG. 5 illustrates a state where the helper touches the region 222a and a wireless signal indicating enablement of wireless operations is transmitted.

When the region 221b of the region 221 is selected and manual operations by the manual operation unit 10 are disabled, the region 222b of the region 222 cannot be selected. Thus, when manual operations by the manual operation unit 10 are disabled, the electric mobility 100 is controlled in such a way that a wireless operation by the wireless operation unit 40 is enabled.

A region 223 in the operation screen 220 illustrated in FIG. 5 is a region for setting which of a manual operation by the manual operation unit 10 or a wireless operation by the wireless operation unit 40 priority should be given to when the manual operation and the wireless operation are simultaneously input and contended. When the helper touches a region 223a of the region 223, the wireless terminal 200 transmits a wireless signal indicating that priority is given to the wireless operation by the wireless operation unit 40. When the helper touches a region 223b of the region 223, the wireless terminal 200 transmits a wireless signal indicating that priority is given to the manual operation by the manual operation unit 10. FIG. 5 illustrates a state where the helper touches the region 223a and a wireless signal indicating that priority is given to a wireless operation is transmitted.

In this way, setting of a manual operation and a wireless operation input by the helper through the operation screen 220 illustrated in FIG. 5 is transmitted as a wireless signal indicating the setting. The electric mobility 100 having received the wireless signal at the receiving unit 46 stores the setting of a manual operation and a wireless operation indicated by the wireless signal as the setting information in the storage unit 50 (see FIG. 3). The control unit 30 of the electric mobility 100 can recognize the setting of a manual operation and a wireless operation input by the helper by reading out the setting information stored in the storage unit 50.

Next, processing performed by the electric mobility 100 of the present embodiment will be described with reference to FIG. 6.

Figure 6:
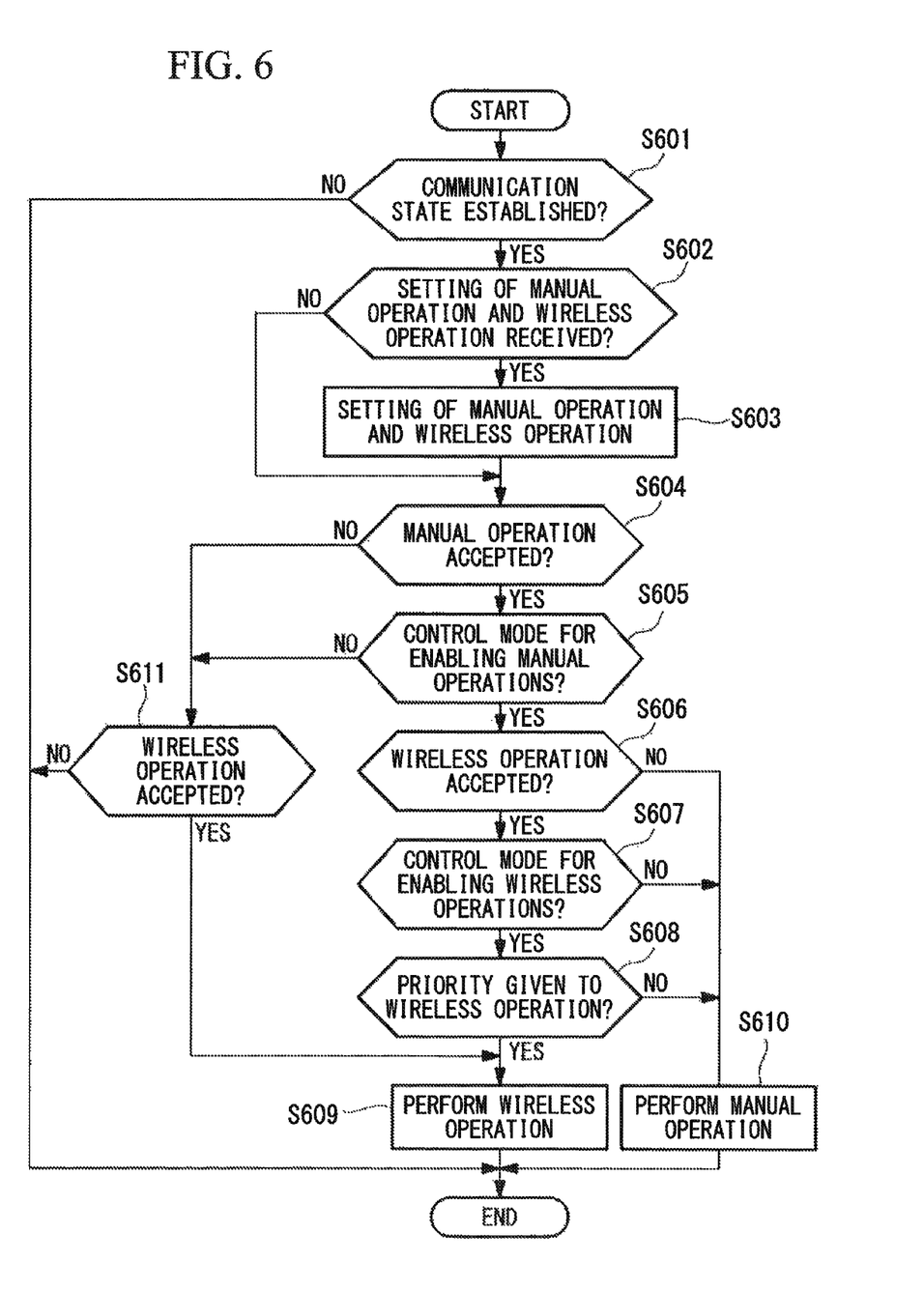
FIG. 6 is a flowchart showing processing performed by the electric mobility illustrated in FIG. 1.

Processes at steps shown in FIG. 6 are performed by the control unit 30 reading out a control program stored in the storage unit 50.

The processes at the steps shown in FIG. 6 will be described below.

At step S601, the control unit 30 determines whether or not a communication state with the wireless terminal 200 is established. When the communication state is established, the control unit 30 advances the processing to step S602. Otherwise, the control unit 30 ends the processing of the flowchart shown in FIG. 6 and performs the processing at step S601 again.

When the communication state with the wireless terminal 200 is not established, the control unit 30 performs neither step S609 nor step S610, which will be described later. In this way, when the communication state with the wireless terminal 200 is not established, the control unit 30 controls the front wheels 20 and the rear wheels 21 to stop.

Here, a case where the communication state with the wireless terminal 200 is established refers to a state where the receiving unit 46 can receive a wireless signal indicating a wireless operation from the wireless terminal 200 and the wireless operation unit 40 can output a steering command signal and a speed command signal on the basis of the received wireless signal. When the receiving unit 46 receives a signal for establishing the communication state (for example, a signal including recognition information indicating that a function of operating the electric mobility 100 by wireless) from the wireless terminal 200 and the receiving unit 46 and the wireless terminal 200 exchange function information or the like with each other, the control unit 30 determines that the communication state is established.

Accordingly, when the receiving unit 46 can receive any wireless signal from outside (for example, a search signal transmitted from an unspecified device) but the wireless operation unit 40 cannot output a steering command signal or a speed command signal on the basis of a wireless signal indicating a wireless operation, the communication state with the wireless terminal 200 is not established.

At step S602, the control unit 30 determines whether or not a wireless signal indicating setting of a manual operation and a wireless operation is received from the wireless terminal 200. When the control unit 30 determines that a wireless signal indicating setting of a manual operation and a wireless operation is received, the control unit 30 advances the processing to step S603. Otherwise, the control unit 30 advances the processing to step S604.

At step S603, the control unit 30 stores the setting of a manual operation and a wireless operation received at step S602 in the storage unit 50. In this way, the setting of a manual operation and a wireless operation is performed. The setting of a manual operation and a wireless operation to be stored in the storage unit 50 is set through the operation screen 220 illustrated in FIG. 5.

The storage unit 50 stores either a control mode (a first control mode) for enabling manual operations by the manual operation unit 10 or a control mode (a second control mode) for disabling the manual operations. Further, the storage unit 50 stores either a control mode for enabling wireless operations by the wireless operation unit 40 or a control mode for disabling the wireless operations. The storage unit 50 stores either a control mode for giving priority to a wireless operation by the wireless operation unit 40 or a control mode for giving priority to a manual operation by the manual operation unit 10 when the manual operation and the wireless operation are contended.

At step S604, the control unit 30 determines whether or not the manual operation unit 10 accepts a manual operation by the operator. When the control unit 30 determines that a manual operation is accepted, the control unit 30 advances the processing to step S605. Otherwise, the control unit 30 advances the processing to step S611.

Here, when the control unit 30 receives a command signal from at least one of the steering command outputting unit 14 and the speed command outputting unit 15 of the manual operation unit 10, the control unit 30 determines that a manual operation is accepted. When the operation member 11 illustrated in FIG. 2 is not operated by the operator, both the steering command outputting unit 14 and the speed command outputting unit 15 output no command signal. Accordingly, when the operation member 11 is not operated by the operator, the control unit 30 determines NO at step S604.

At step S605, the control unit 30 reads out the setting stored in the storage unit 50 and determines whether or not the control mode for enabling manual operations by the manual operation unit 10 has been set. When the control mode for enabling manual operations has been set, the control unit 30 advances the processing to step S606. When the control mode for disabling manual operations has been set, the control unit 30 advances the processing to step S611.

In this way, according to the electric mobility 100 of the present embodiment, when the control mode for disabling manual operations is set as step S603, the manual operation unit 10 may accept a manual operation by the operator at step S604 but the front wheels 20 and the rear wheels 21 cannot be controlled by the manual operation.

At step S606, the control unit 30 determines whether or not the wireless operation unit 40 accepts a wireless operation by the helper. When the control unit 30 determines that the wireless operation is accepted, the control unit 30 advances the processing to step S607. Otherwise, the control unit 30 advances the processing to step S610.

Here, when the control unit 30 receives a command signal from at least one of the steering command outputting unit 44 and the speed command outputting unit 45 of the wireless operation unit 40, the control unit 30 determines that a wireless operation is accepted. When the operation piece 211 illustrated in FIG. 5 is not operated by the helper, both the steering command outputting unit 44 and the speed command outputting unit 45 output no command signal. Accordingly, when the operation piece 211 is not operated on the operation screen 210 of the wireless terminal 200 by the helper, the control unit 30 determines NO at step S606.

At step S607, the control unit 30 reads out the setting stored in the storage unit 50 and determines whether or not the control mode for enabling wireless operations by the wireless operation unit 40 has been set. When the control mode for enabling wireless operations has been set, the control unit 30 advances the processing to step S608. Otherwise, the control unit 30 advances the processing to step S610.

In this way, according to the electric mobility 100 of the present embodiment, when the control mode for disabling wireless operations is set as step S603, the wireless operation unit 40 may accept a wireless operation by the helper at step S606 but the front wheels 20 and the rear wheels 21 cannot be controlled by the wireless operation.

At step S608, the control unit 30 reads out the setting stored in the storage unit 50 and determines whether or not the control mode for giving priority to wireless operations has been set. When the control mode for giving priority to wireless operations has been set, the control unit 30 advances the processing to step S609. When the control mode for giving priority to manual operations has been set, the control unit 30 advances the processing to step S610.

In this way, according to the electric mobility 100 of the present embodiment, when a manual operation by the manual operation unit 10 accepted at step S604 and a wireless operation by the wireless operation unit 40 accepted at step S606 are contended, either the manual operation or the wireless operation can be preferentially performed on the basis of the setting stored in the storage unit 50.

At step S609, the control unit 30 performs a wireless operation for controlling the right driving wheel 21a and the left driving wheel 21b on the basis of a steering command signal output by the steering command outputting unit 44 and a speed command signal output by the speed command outputting unit 45. After performing the wireless operation, the control unit 30 ends the processing of the present flowchart and starts the process at step S601 again.

At step S610, the control unit 30 performs a manual operation for controlling the right driving wheel 21a and the left driving wheel 21b on the basis of a steering command signal output by the steering command outputting unit 14 and a speed command signal output by the speed command outputting unit 15. After performing the manual operation, the control unit 30 ends the processing of the present flowchart and starts the process at step S601 again.

At step S611, the control unit 30 determines whether or not the wireless operation unit 40 accepts a wireless operation by the helper. When the control unit 30 determines that a wireless operation is accepted, the control unit 30 advances the processing to step S609. Otherwise, the control unit 30 ends the processing of the present flowchart and starts the process at step S601 again.

Operations and effects of the present embodiment described above will be described.

According to the electric mobility 100 of the present embodiment, the control unit 30 controls the driving wheels on the basis of either a command signal (the first command signal) output by the manual operation unit 10 or a command signal (the second command signal) output by the wireless operation unit 40. In this case, when an operator who needs help occupies the electric mobility 100, a helper transmits a wireless signal for setting the control mode (the second control mode) for disabling manual operations from the wireless terminal 200. Accordingly, the driving wheels cannot be operated by the manual operation unit 10. Thus, even when the manual operation unit 10 accepts a manual operation due to an incorrect operation or the like by the operator who needs help, the driving wheels cannot be controlled by the manual operation. On the other hand, when an operator who can steer the electric mobility 100 by himself/herself occupies the electric mobility 100, a wireless signal for setting the control mode (the first control mode) for enabling manual operations is transmitted from the wireless terminal 200 and the operator can operate the driving wheels with the manual operation unit 10.

When the electric mobility 100 of the present embodiment operates in the control mode for enabling manual operations, the control unit 30 disables control of the driving wheels on the basis of a command signal output by the wireless operation unit 40.

In this way, when the control mode for enabling manual operations is set and the operator operates the driving wheels with the manual operation unit 10, the helper may input a wireless operation through the wireless terminal 200 but the driving wheels cannot be operated by a command signal generated by the wireless operation. Therefore, when the electric mobility 100 of the present embodiment operates in the mode for enabling manual operations, control of the driving wheels that is unintended by the operator can be prevented.

In the electric mobility 100 of the present embodiment, when the control mode for enabling manual operations is set and the operator operates the driving wheels with the manual operation unit 10, both the manual operation unit 10 and the wireless operation unit 40 may output command signals. At that time, the driving wheels are controlled on the basis of the command signal output by the wireless operation unit 40 preferentially over the command signal output by the manual operation unit 10. Therefore, even when the operator inputs an incorrect operation or the like, the helper can operate the electric mobility 100 in a way intended by the helper.

In the electric mobility 100 of the present embodiment, when the control mode for enabling manual operations is set and the operator operates the driving wheels with the manual operation unit 10, both the manual operation unit 10 and the wireless operation unit 40 may output command signals. At that time, the driving wheels are controlled on the basis of the command signal output by the manual operation unit 10 preferentially over the command signal output by the wireless operation unit 40. Therefore, when the control mode for enabling manual operations is set, the operator can operate the electric mobility 100 in a way intended by the operator.

In the electric mobility 100 of the present embodiment, when a communication state with the wireless terminal 200 is not established, the control unit 30 controls the driving wheels to stop.

In this way, when the helper cannot operate the electric mobility 100 through a wireless operation from the wireless terminal 200, the electric mobility 100 can be kept stopping even if the operator performs a manual operation. Therefore, when the operator cannot be helped by the helper, the operator can be prevented from operating the driving wheels.

Other Embodiments

In the above descriptions, after a communication state with the wireless terminal 200 is established, the electric mobility 100 sets either the control mode (the first control mode) for enabling manual operations or the control mode (the second control mode) for disabling manual operations on the basis of setting of a manual operation and a wireless operation received from the wireless terminal 200. However, other embodiments can be provided.

For example, when a communication state with the wireless terminal 200 is established and then the communication is temporarily interrupted, the electric mobility 100 may automatically set the control mode (the first control mode) for enabling manual operations.

In this case, after the communication state with the electric mobility 100 is established, the wireless terminal 200 transmits a wireless signal for confirming the communication state to the electric mobility 100 at fixed intervals (for example, at every 0.1 second). When the receiving unit 46 receives wireless signals at fixed intervals, the control unit 30 of the electric mobility 100 determines that the communication state is established. On the other hand, when a state where the receiving unit 46 does not receive wireless signals, which should be received at fixed intervals, lasts (for example, a state where the receiving unit 46 does not receive wireless signals lasts for a second), the control unit 30 of the electric mobility 100 determines that the communication state with the wireless terminal 200 is interrupted.

When the control unit 30 determines that the communication state with the wireless terminal 200 is interrupted, the control unit 30 sets the control mode (the first control mode) for enabling manual operations. Accordingly, even when the control mode (the second control mode) for disabling manual operations is set through the wireless terminal 200, interruption of the communication state with the wireless terminal 200 causes the control mode (the first control mode) for enabling manual operations to be set.

In this way, even when wireless operations by the wireless terminal 200 are temporarily disabled due to a used state of the wireless terminal 200 or the like (for example, an incoming call at the wireless terminal 200 having a phone call function), the electric mobility 100 can be operated through manual operations. Thus, even when wireless operations are temporarily disabled at a dangerous place (a pedestrian crossing, a railroad crossing, or the like), the electric mobility 100 can be moved through manual operations.

When the control mode (the second control mode) for disabling manual operations is set on the basis of a wireless signal transmitted from the wireless terminal 200 and interruption of the communication state with the wireless terminal 200 lasts for a predetermined time (for example, for a minute), the electric mobility 100 may switch the control mode for enabling manual operations to the control mode for disabling manual operations. Accordingly, manual operations by the operator can be temporarily enabled until a predetermined time has elapsed since interruption of the communication state and the control mode can be switched to the control mode for disabling manual operations again.

When the control mode (the second control mode) for disabling manual operations is set on the basis of a wireless signal transmitted from the wireless terminal 200 and the communication state with the wireless terminal 200 returns from the interrupted state to the established state, the electric mobility 100 may switch the control mode for enabling manual operations to the control mode for disabling manual operations. Here, for example, when a state where the receiving unit 46 receives wireless signals, which should be received at fixed intervals, lasts (for example, a state where the receiving unit 46 receives wireless signals lasts for a second), the control unit 30 of the electric mobility 100 determines that the communication state with the wireless terminal 200 is established. In this way, manual operations by the operator can be temporarily enabled from interruption to re-establishment of the communication state and the control mode can be switched to the control mode for disabling manual operations again.

In the above descriptions, the electric mobility 100 controls the forward speed, the backward speed, and the travelling direction of the electric mobility 100 by controlling respective powers of the pair of electric motors separately. However, other embodiments can be provided. For example, respective powers of a pair of electric motors may be separately controlled and a pair of driving wheels may be rotated in a same direction to control the forward speed and the backward speed. In this case, a steering angle with respect to the traveling direction of a pair of driven wheels is driven by a steering motor (not illustrated) to control the traveling direction.

The invention claimed is:

1. An electric mobility apparatus comprising:
   an electric driving wheel,
   a body that supports the electric driving wheel in a rotatable way around an axle;
   a manual operation unit that accepts a manual operation by an operator and outputs a first command signal to drive the electric driving wheel;
   a wireless operation unit that accepts a wireless operation transmitted from a wireless terminal and outputs a second command signal to drive the electric driving wheel; and
   a control unit that controls the electric driving wheel on the basis of either the first command signal output by the manual operation unit or the second command signal output by the wireless operation unit, wherein
   the control unit sets a first control mode in which a manual operation of the electric driving wheel by the manual operation unit is enabled and a second control mode in which a manual operation of the electric driving wheel by the manual operation unit is disabled on the basis of a wireless signal transmitted from the wireless terminal,
   wherein when the electric mobility apparatus is operated in the first control mode, the control unit disables control of the electric driving wheel based on the second command signal.

2. An electric mobility apparatus according to claim 1, wherein when a communication state with the wireless terminal is not established, the control unit sets the second control mode.

3. An electric mobility apparatus according to claim 1, wherein when a communication state with the wireless terminal is established and then interrupted, the control unit sets the first control mode.

4. An electric mobility apparatus according to claim 3, wherein when the second control mode is set on the basis of a wireless signal transmitted from the wireless terminal and a predetermined time has elapsed since interruption of the communication state, the control unit switches the first control mode to the second control mode.

5. An electric mobility apparatus comprising:
an electric driving wheel,
a body that supports the electric driving wheel in a rotatable way around an axle;
a manual operation unit that accepts a manual operation by an operator and outputs a first command signal to drive the electric driving wheel;
a wireless operation unit that accepts a wireless operation transmitted from a wireless terminal and outputs a second command signal to drive the electric driving wheel; and
a control unit that controls the electric driving wheel on the basis of either the first command signal output by the manual operation unit or the second command signal output by the wireless operation unit, wherein
the control unit sets a first control mode in which a manual operation of the electric driving wheel by the manual operation unit is enabled and a second control mode in which a manual operation of the electric driving wheel by the manual operation unit is disabled on the basis of a wireless signal transmitted from the wireless terminal,
wherein when the electric mobility apparatus is operated in the first control mode and both the first command signal and the second command signal are output, the control unit controls the electric driving wheel on the basis of the first command signal output by the manual operation unit.

6. An electric mobility apparatus according to claim 5, wherein when a communication state with the wireless terminal is not established, the control unit sets the second control mode.

7. An electric mobility apparatus according to claim 5, wherein when a communication state with the wireless terminal is established and then interrupted, the control unit sets the first control mode.

8. An electric mobility apparatus according to claim 7, wherein when the second control mode is set on the basis of a wireless signal transmitted from the wireless terminal and a predetermined time has elapsed since interruption of the communication state, the control unit switches the first control mode to the second control mode.

9. An electric mobility apparatus comprising:
an electric driving wheel,
a body that supports the electric driving wheel in a rotatable way around an axle;
a manual operation unit that accepts a manual operation by an operator and outputs a first command signal to drive the electric driving wheel;
a wireless operation unit that accepts a wireless operation transmitted from a wireless terminal and outputs a second command signal to drive the electric driving wheel; and
a control unit that controls the electric driving wheel on the basis of either the first command signal output by the manual operation unit or the second command signal output by the wireless operation unit, wherein
the control unit sets a first control mode in which a manual operation of the electric driving wheel by the manual operation unit is enabled and a second control mode in which a manual operation of the electric driving wheel by the manual operation unit is disabled on the basis of a wireless signal transmitted from the wireless terminal,
wherein when a communication state with the wireless terminal is established and then interrupted, the control unit sets the first control mode.

10. An electric mobility apparatus according to claim 9, wherein when the second control mode is set on the basis of a wireless signal transmitted from the wireless terminal and a predetermined time has elapsed since interruption of the communication state, the control unit switches the first control mode to the second control mode.

11. An electric mobility apparatus comprising:
an electric driving wheel,
a body that supports the electric driving wheel in a rotatable way around an axle;
a manual operation unit that accepts a manual operation by an operator and outputs a first command signal to drive the electric driving wheel;
a wireless operation unit that accepts a wireless operation transmitted from a wireless terminal and outputs a second command signal to drive the electric driving wheel; and
a control unit that controls the electric driving wheel on the basis of either the first command signal output by the manual operation unit or the second command signal output by the wireless operation unit, wherein
the control unit sets a first control mode in which a manual operation of the electric driving wheel by the manual operation unit is enabled and a second control mode in which a manual operation of the electric driving wheel by the manual operation unit is disabled on the basis of a wireless signal transmitted from the wireless terminal, wherein
when the electric mobility apparatus is operated in the first control mode and both the first command signal and the second command signal are output, the control unit controls the electric driving wheel on the basis of the second command signal output by the wireless operation unit,
wherein when a communication state with the wireless terminal is established and then interrupted, the control unit sets the first control mode.

12. An electric mobility apparatus according to claim 11, wherein when the second control mode is set on the basis of a wireless signal transmitted from the wireless terminal and a predetermined time has elapsed since interruption of the communication state, the control unit switches the first control mode to the second control mode.

* * * * *